(12) United States Patent
Hartrumpf (10) Patent No.: US 6,858,836 B1
(45) Date of Patent: Feb. 22, 2005

(54) LASER SCANNER MEASUREMENT SYSTEM

(75) Inventor: Matthias Hartrumpf, Karlsruhe (DE)

(73) Assignee: Fraunhofer Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/622,278

(22) PCT Filed: Feb. 11, 1999

(86) PCT No.: PCT/EP99/00903
§ 371 (c)(1),
(2), (4) Date: Sep. 20, 2000

(87) PCT Pub. No.: WO99/41568
PCT Pub. Date: Aug. 19, 1999

(30) Foreign Application Priority Data

Feb. 16, 1998 (DE) .......................................... 198 06 288

(51) Int. Cl.[7] .............................. H01J 3/14; H01J 40/14; H01J 5/16
(52) U.S. Cl. .................................... 250/234; 250/559.19
(58) Field of Search ................................. 250/234, 224, 250/559.19, 559.21, 559.27; 356/625, 635, 638

(56) References Cited

U.S. PATENT DOCUMENTS

| | | | |
|---|---|---|---|
| 4,124,728 A | 11/1978 | Marcuse et al. | 427/8 |
| 4,201,476 A | 5/1980 | Musto et al. | 356/386 |
| 4,408,884 A | 10/1983 | Kleinknecht et al. | 356/355 |
| 4,432,648 A | 2/1984 | Musto et al. | 356/387 |
| 4,748,332 A | 5/1988 | Kühne et al. | 250/560 |
| 4,778,271 A | 10/1988 | Kuwabara et al. | 356/386 |
| 5,335,057 A | 8/1994 | Shaw et al. | 356/73.1 |
| 5,377,002 A | * 12/1994 | Malin et al. | 356/237 |
| 5,691,839 A | * 11/1997 | Kobayashi | 359/385 |
| 5,693,953 A | * 12/1997 | Pryor et al. | 250/559.2 |
| 6,271,916 B1 | * 8/2001 | Marxer et al. | 356/237.3 |

FOREIGN PATENT DOCUMENTS

| | | | |
|---|---|---|---|
| DE | 3526656 A 1 | 2/1986 | G01B/11/02 |
| DE | 3623318 A 1 | 1/1988 | G01B/11/02 |
| DE | 2657938 C2 | 5/1989 | G01B/11/02 |
| DE | 3820170 A 1 | 12/1989 | G01J/9/02 |
| DE | 4114786 A 1 | 11/1992 | G01P/13/00 |
| DE | 4134148 A 1 | 4/1993 | G01B/11/02 |
| DE | 19621709 A 1 | 12/1997 | G01B/11/00 |
| EP | 0 416 362 A2 | 3/1991 | G01N/21/47 |
| EP | 0 439 802 A2 | 8/1991 | G01B/11/02 |
| EP | 0 439 803 A2 | 8/1991 | G01B/11/08 |
| GB | 1 498 227 | 1/1978 | G01B/11/00 |

OTHER PUBLICATIONS

K.-S. Chang et al., "Correction Algorithms in a Laser Scanning Dimension Measurement System", in *8049a IEE Proceedings-A, 139* (1992) March, No. 2, ParetA,Stevenage, Herts, Great Britain.

* cited by examiner

*Primary Examiner*—Thanh X. Luu
*Assistant Examiner*—Seung C. Sohn
(74) *Attorney, Agent, or Firm*—Venable LLP; Catherine M. Voorhees (57) ABSTRACT

The invention relates to a laser scanner measurement system, comprising a transmission unit consisting of a laser, beam deflection unit and transmitting optical system, and a receiving part with a photodetector which is arranged in the focal plane of the optical system destined for the receiving beam path. The invention is characterized in that the scanner unit and receiving unit are arranged on the same side in relation to the object and the surface normal of the receiving optical system is parallel to the direction of radiation of the scanner unit, i.e. that the scanner and receiver beam path in the outer area at all times have the same optical axis or that the axes are displaced parallel to each other and perpendicular to the direction of movement of the laser beam.

27 Claims, 8 Drawing Sheets

Fig. 1

Prior Art

LASER SCANNER MEASUREMENT SYSTEM

BACKGROUND OF THE INVENTION

The present invention relates to a laser scanner measuring system for measuring objects accessible from one side and/or having complex shapes or structures, of the type which has an emitter unit that is provided with a laser, a beam deflector unit and an optical emitter system which define a scanning beam path as well as a scanning plane, as well as a receiving unit that includes a photo detector that is disposed in the focal plane of an optical receiver system for a receiver beam path, the arrangement being such that the surface normal to the optical receiver system is parallel with the scanning beam path.

PRIOR ART

Figure 1:
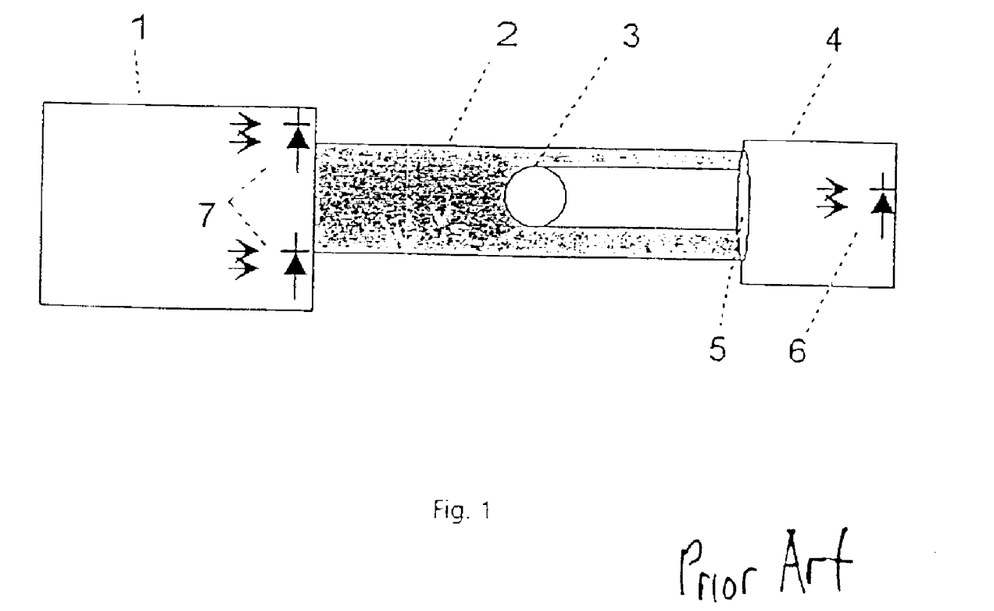
FIG. 1 is an example showing the known principle of a telecentric laser scanner.

For measuring bodies accessible from both sides, telecentric laser scanners have been used. FIG. 1 illustrates the principle of these scanners. The scanner unit (1) emits a laser beam (2) directed onto the opposite receiver unit (4). When an object to be measured (3) is not placed into the beam path the beam path will arrive in the receiver without being influenced, and is detected there with a photo diode (6) disposed in the focal point of the optical system of the receiver (5). When the beam hits an object to be measured, it is vignetted. For measuring, the laser beam is shifted in parallel with the line interconnecting the scanner and the receiver at a constant rate (scanning rate $v_s$). When the scanning rate is known it is possible to calculate the size of the object to be measured along a direction normal on the shifting direction by derivation from the beam vignetting period.

The scanning rate can be taken into consideration according to the following methods:
1. it is maintained constant, e.g. by means of an automatic controller, and this constant value is considered as a parameter in evaluation;
2. it is measured. The measurement is performed, for example, indirectly via a measurement of the angular speed of the deflector unit in the scanner or directly by means of two photo diodes (7) invariably arranged in the scanner. The photo diodes detect the time of scan start ($t_{start}$) or of scan stop ($t_{stop}$). The scanning rate is the quotient of the spacing of the photo diodes by the time difference between the scan stop and the scan start. The spacing of the photo diodes is determined by calibration.

In other scanning concepts, a specific diaphragm and two photo diodes are used, instead of one photo diode in the focal plane of the optical receiving system (EP 0 439 803). This concept permits the measurement of the shadow cast by objects having an extension smaller than the beam diameter of the laser beam. To this end, the Fraunhofer diffraction pattern is analyzed when the laser beam is directed precisely onto the object to be measured. This point of time is characterized by the fact that the sum of both intensities is at a maximum. The size of the object to be measured is then determined by derivation from the ratio of the intensities measured by the individual photo diodes by that point of time.

BRIEF SUMMARY OF THE INVENTION

In the last analysis, the laser scanners described above are only suitable for measuring objects accessible from both sides. On principle, all those properties can be measured which result in a complete vignetting of the laser beam by the object to be measured. Such properties are, for instance:

the diameter in the case of solid rods, the maximum extension along the scanning direction (the direction in which the laser beam moves through the measuring field in the course of time) in the case of profiled bodies, the width of the teeth or the gaps between the teeth in the case of comb-shaped structures.

Properties of an object, which do not result in complete vignetting or in Fraunhofer diffraction, respectively, or measuring objects accessible from one side only cannot be measured by means of telecentric laser scanners in accordance with prior art.

The problem underlying the invention includes the improvement of the laser scanner measuring system in such a way that it will be suitable for measuring objects accessible from one side and/or having complex shapes or structures. In accordance with the invention, this is achieved by the laser scanner measuring system disclosed herein. Expedient embodiments of the measuring system are also disclosed herein.

BRIEF EXPLANATION OF THE DRAWINGS

FIGS. 9a/b show two examples wherein a laser scanner measuring system according to the present invention is built as a modular system;

FIGS. 10a/b show different elements for use in a modular system according to FIGS. 9a/b.

DETAILED DESCRIPTION OF THE INVENTION

The subject matter of the invention is a laser scanner measuring system for measuring objects accessible from one side and/or having complex shapes or structures. In the following description, common reference numerals described herein also refer to similarly numbered features throughout the drawings.

Figure 2:
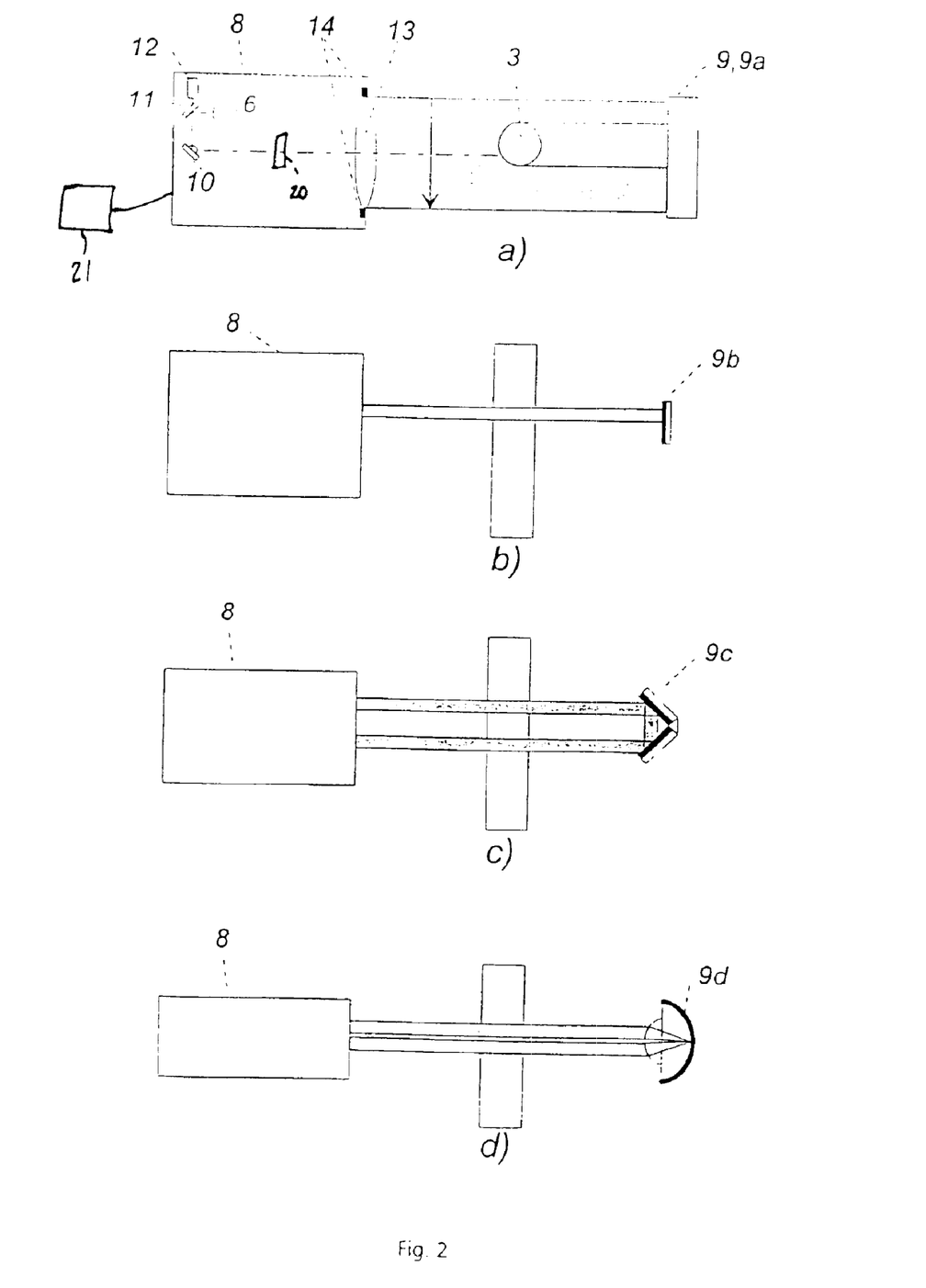
FIGS. 2a–d show examples of laser scanner measuring systems according to the present invention with different retro reflectors.

The measurement from one side is achieved by a laser scanner measuring system which includes, for instance, a combined illuminating/receiving unit (cf. item 8 in FIG. 2). The laser beam, which is emitted from the laser 12, passes through the beam splitter 11 and arrives, via the deflector unit 10 and the combined optical emitter/receiving unit 13, in the outside space. When the laser beam hits on a reflecting surface element of the object to be measured, which has a surface normal coinciding with the direction of the laser beam, the laser beam is reflected back into the receiver unit. It arrives, via the optical system, the deflector unit and the beam splitter, on the detector 6. It is then possible to derive the position of this surface element with an orientation orthogonal on the laser beam from the measurement of the point of time by which the laser beam is reflected back. In this manner it is possible, for example, to determine the center of a polished or glossy rod having a circular cross-section.

The extension of objects having a dull surface can be measured if the scattering properties of the object surface can be distinctly distinguished from the scattering characteristics of the background 9.

When the laser beam scans over an object surface having scattering properties varying in the measuring field, the extension of zones having a distinctly different scattering characteristic can be measured. When the object has a dull surface in the solid state and a glossy surface in the liquid state, for instance, it is possible to determine the size of the liquid zone from the development of intensity versus time.

The measurement of the beginning or the end of a scan can be achieved by providing two retro-reflecting markers (sheet points) which are arranged in the scanner receiving unit. The points of time can then be detected by means of the receiving diode.

When a retro-reflecting unit can be arranged behind the object to be measured, when seen in the direction of emission (e.g. a retro-reflecting sheet 9a, mirrored cuboid corner 9b or a "lens-type" retro reflector), it is possible to measure further properties of the object. The retro reflector unit reflects the impinging beams along their own extension or in the direction orthogonal on the scanning plane (defined by the optical axis of the laser scanner and the direction of movement of the laser beam) back into the scanner receiving unit with an offset. With special configurations or arrangements of the retro reflector, specific types of measurement can be implemented. The following particularly excellent embodiments should be mentioned here as examples:

when the sheet reflector (9b in FIG. 2b) is used it is possible to determine the cast shade and to derive from the shade the outside contour of an object to be measured, which is practically accessible from one side only;

other retro reflectors (in the form of two mirrors orthogonal on each other (cf. 9c in FIG. 2c), prisms or retro reflectors consisting of a combination of two spherical lenses or cylindrical lenses, respectively, which is made reflective on the rear side (9d in FIG. 2d)) permit the measurement of the maximum or mean extension of the object to be measured via the direction orthogonal in the axis of symmetry of the retro reflector, depending on the dimensioning of the optical and electronic systems of the scanner system.

Apart from the possibility to detect further geometric parameters of the object to be measured or the possibility to measure objects accessible with difficulties only, an inventive array with retro reflectors offers the advantage that only one unit must be cabled. When a sheet reflector is used it is moreover not required to adjust the reflector unit.

A very precise determination of the point of time by which the laser beam hits the object to be measured can be implemented by arranging a dark stop ahead of the photo detector and by letting the electronic analysing system determine the points of time at which the radiation incident on the detector reaches a maximum level.

Figure 3:
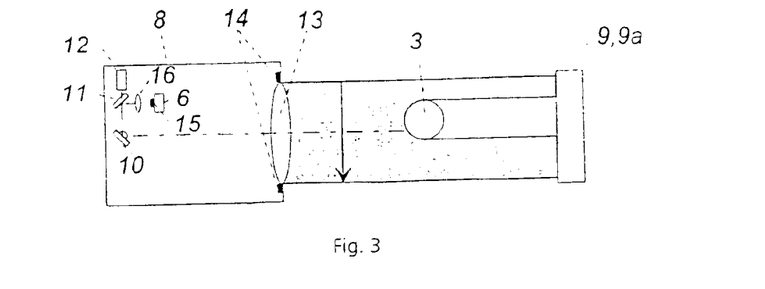
FIG. 3 shows an example of a laser scanner measuring system according to the present invention including a dark stop.
Figure 4:
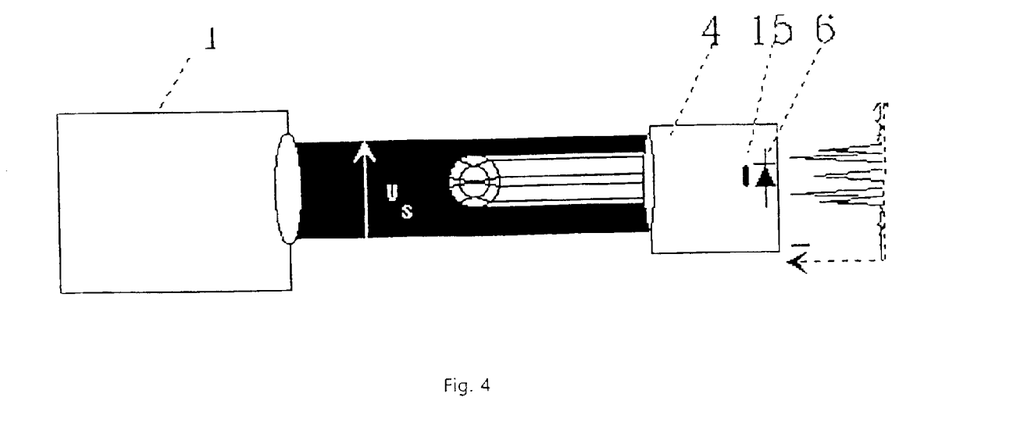
FIG. 4 shows a further example of a laser scanner measuring system according to the present invention including a dark stop.

This technique of evaluation makes use of the diffraction of the limiting rays on the object edges. It is only slightly influenced by variations of the laser output and a variation of the intensity of the laser radiation in the course of the scanning operation. It can be realised with both a laser scanner with separate emitter and receiver units (cf. FIG. 4) and laser scanners comprising a joint emitter/receiver unit (cf. FIG. 3). In the latter case, it may be expedient to dispose an additional lens 16 ahead of the dark field stop.

When telecentric laser scanners in correspondence with prior art are used to measure glass tubes, malfunctioning may occur because there are three additional excellent beam paths, apart from the shade edges on the outside diameter, along which light arrives from the scanner unit in the receiver:

1. tube centre: the tube produces the effect of a lens there, the central beam arrives on the detector practically without any weakening;
2. two reflections on the inner wall: the radiation incident on the tube is refracted, when entering the tube, towards the centre of the tube, is reflected on the inner wall and undergoes further refraction when leaving the tube. The incident and emerging beams are parallel to each other at precisely two locations on the tube so that the beams can be detected in the receiver. The positions of these locations on the tube is dependent on the diameter, the thickness of the wall and the refractive index of the tube.

The amplitudes of these signals are low in arrays in correspondence with prior art and yet they are suitable to interfere with measurement. One of the inventive arrays leads to the effect that the reflections on the inner wall provide very well detectable signals with a high signal-to-noise ratio from which the wall thickness of the tubes can be calculated. These signals are appropriate for very good analysis by determining those points of time by means of the electronic analyzing system by which the signal reaches local maximum levels. One method to this end consists in a verification of the following conditions by means of the electronic analyzing system 21:

1. The derivative of the signal presents a zero crossing;
2. The signal exceeds the noise.

When the times by which both conditions are satisfied are measured the diameter and two values of the wall thickness can be detected on glass tubes in a manner comparatively insensitive to interference.

Figure 5:
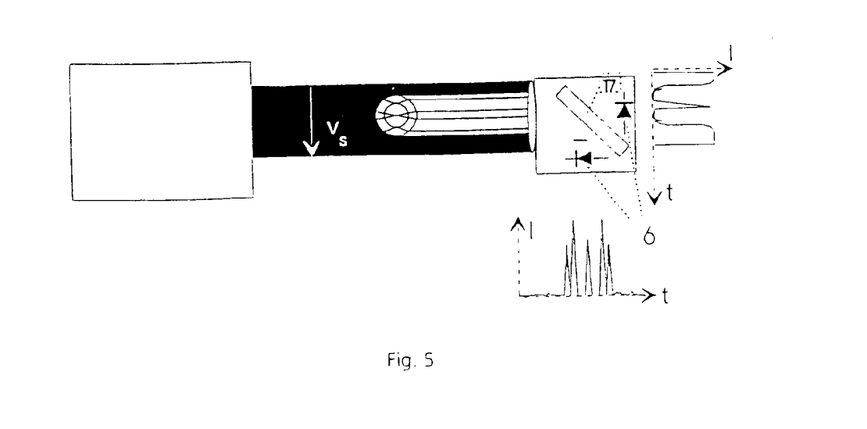
FIG. 5 shows a further example of a laser scanner measuring system according to the present invention including a dark stop.
Figure 6:
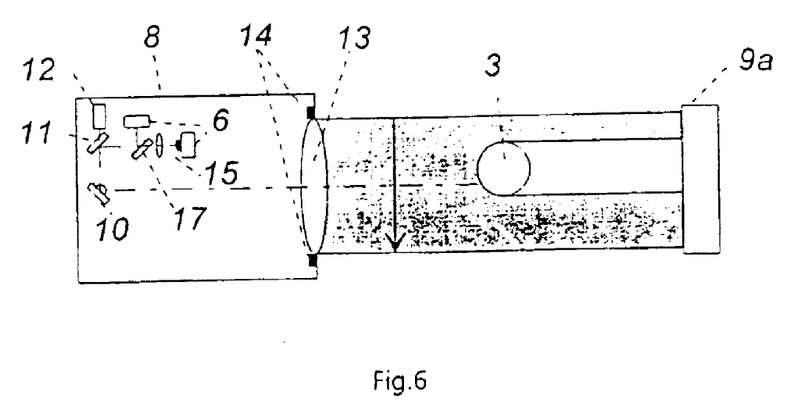
FIG. 6 shows a further example of a laser scanner measuring system according to the present invention including a dark stop.

Interference may occur with this type of evaluation of the edges and the reflection when the measurement must be performed in a dust-loaded environment or in an environment presenting strong movements or turbulences of the air. In these cases a system can be employed to achieve a substantial increase of the robustness of the measurement. To this end, the receiver beam path is split by means of a beam splitter 17 (cf. FIG. 5 and FIG. 6) in such a way that one part of the radiation arrives on a photo diode with a dark field stop ahead of it, while another part of the radiation arrives directly on a second photo diode. The edges can be detected in the aforedescribed manner. The intensity measurement, which is additionally provided, issued to ensure that only signal maximums in the zone between the shadow edges will be used for evaluation. Interference caused by striation in the air or by dust in the zone outside the shadow edges are eliminated by inhibiting the evaluation as long or as soon as the signal on the second photo diode exceeds a threshold (which can be set if necessary).

An equivalent detection of the edge and reflection positions can be performed when, a photo diode array or a photo diode matrix is arranged, instead of one photo diode, in the focal plane of the optical system of the receiver or behind the beam deflector unit. It must be so disposed that one element of the array detects that fraction of the radiation which passes through the outside space without any interaction with the object to be measured. The signal of this element displays a development versus time which can also be detected with the second photo diode, but it has the double amplitude (since losses are not created on the beam splitter).

When a position-sensitive photo diode is provided it is possible to measure the position of the shadow edges or of the inside reflections, and additionally the mean differential angle of the surfaces of a partially transparent object to be measured, relative to the scanning direction and the scanning plane. The additional measurement makes use of the effect that the angle of the surface elements entails a deflection of the transmitted beam, which can be detected as level offset in the focal plane.

A position-sensitive photo diode moreover permits the simultaneous detection of the reflection on the object surface and of the tilting angle of the object relative to the scanning plane. To this end, it is incorporated as a sensor in a receiver which is arranged at an angle different from 0° or 180° relative to the optical axis of the scanner.

When two receivers are arranged on opposite sides of the object to be measured, at an angle relative to the scanning direction, it is possible to measure objects to be measured which have an extension wider than the width of the scanned zone. When the receivers are arranged, for instance, at angle of ±90° relative to the beam direction, a reduction by a factor of $2^{05}$ is achieved for objects having a circular cross-section. This means that objects having an extension of up to 1.4 times that of the scanned zone can still be measured.

Figure 7:
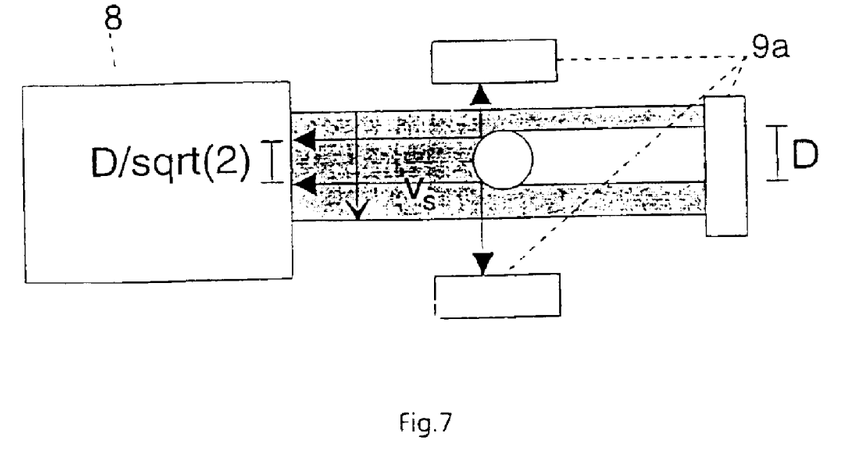
FIG. 7 shows an example of a laser scanner measuring system according to the present invention having several (additional) retro reflector units on different positions relative to an object.

The arrangement of several (additional) retro reflector units on appropriate locations constitutes an equivalent, provided that a combined emitter/receiver unit is used (cf. FIG. 7).

The angle of the receiver or the retro reflector unit(s) relative to the scanning direction can be selected so as to vary the scale of reduction over a wide range.

When several retro reflectors are used for measurement and arranged, for example, at angles of 180°, +90° and −90° relative to the scanner unit the centre and several points along the periphery of the object to be measured are obtained (cf. FIG. 7). On the basis of these values it is possible, for instance, to measure the variation of the shape of the object to be measured from the ideal shape. The measured object cross-section can be defined, for instance, by an ellipse. The variation of the cross-section from an ideal circular shape can then be determined from the parameters of the ellipse.

When such an array is arranged with a scanner having a convergent or divergent emitting direction two tangents on the object to be measured can be determined from the limiting rays (shadow edges). Additional points on the object surface are obtained by an evaluation of the retro reflected beams. It is possible to determine the diameter and the position of the object to be measured in the scanning plane from these measured parameters.

This arrangement entails further advantages when transparent tubes are measured. The distance between the rays reflected on the outside wall and the inside wall is substantially greater with this array than in the 180° array. It allows therefore for an improvement of the measuring precision or the measurement of thin-walled tubes, respectively.

Figure 8:
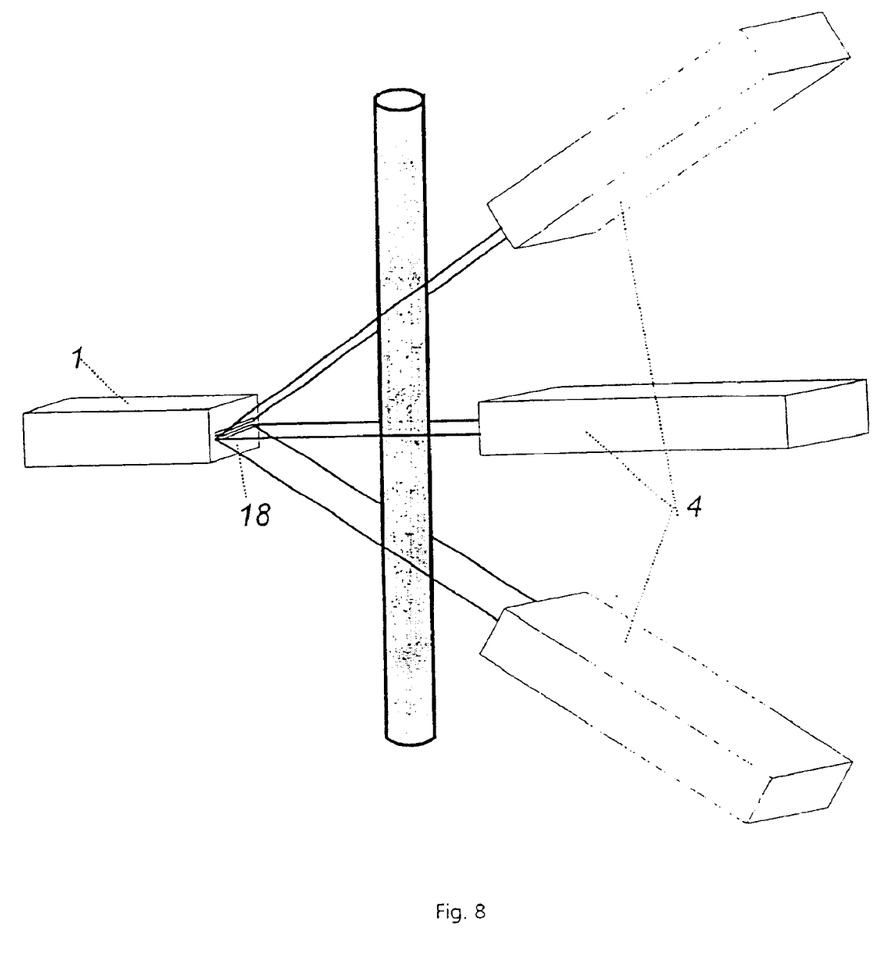
FIG. 8 shows an example of a laser scanner measuring system according to the present invention, wherein the laser beam is split by optical means in a direction orthogonal on the scanning plane and wherein a separate receiver is provided for each scanning line.

As shown in FIG. 8, further geometric characteristics of the object to be measured are accessible to measurement if the laser beam is split by optical means 18 (such as a grid disposed in parallel with the scanning direction) in a direction orthogonal on the scanning plane. When separate receivers 4 are used, a separate receiver is provided for each scanning line. When a combined scanner/receiver unit is used, a grid is arranged preferably ahead of the beam splitter for splitting between the paths of the emitted and received beams, and splitting is performed by means of the grid. Then one respective photo diode or an element of a photo diode array is disposed in the path of the received beam in the focal point of the optical system per beam path to be evaluated. Due to the splitting of the scanning beam path into several partial beam paths, it is possible to determine the development of the object geometry along the plane orthogonal to the scanning plane. With this provision, it is possible, for instance, to detect reliably a conical extension of the object contour or a curvature of the object to be measured.

A wider angle between the partial beam paths can be achieved, if necessary, by the application of an optical cylinder system in the emission beam path.

An extension of the measuring method becomes possible by an optical structural element for splitting a laser beam into several partial beam paths located in the scanning plane for instance a grid having lines extending orthogonally on the scanning plane).

When the element is disposed in the zone between the laser and the focal point of the optical scanner system several beams hit the deflector unit in the focal plane of the optical emitter system. As a result, the scanner unit emits several beam bundles. They are located in the scanning plane (the plane defined by the scanning direction and the optical axis) but they present angle relative to the scanning direction (which may possibly vary as a function of the site). These beams are vignetted, diffracted or reflected on the measured object. To this end there one photo detector or an element of a detector array must be provided there per partial beam path. It is then possible to measure the position of the object in the illuminated plane via an analysis of the shadow edges or the reflection or diffraction peaks, respectively, of the corresponding development of intensity versus time.

The arrangement of polarising beam splitters in the beam path permits the detection of the polarisation state of the detected radiation. In this way, those object properties can be measured which take different influences on the polarisation states of the transmitted beams. One respective additional detector element must be provided per measurand to be detected, in addition to the beam splitter. The object characteristic to be detected can be determined from the differences between the intensities.

For birefringent or optically active sheets it is possible, for instance, to determine the length of the optical path and thus the thickness of the layer or the ability of rotation towards the optical axis. To this end a scanner with a circularly polarised laser beam is used, together with a polarising beam splitter in the emitter or receiver beam path, and for each partial beam path a photo detector (element) is disposed.

Further additional parameters of the object can be measured, which take an influence on the polarisation of the transmitted radiation, provided that the radiation components of different polarisations are split both in the emitter and the receiver beam paths.

When, in addition to this splitting, one or several filters 20 are inserted into the receiver beam path, which are selective in terms of wavelength, it is possible to measure the following parameters for substances (such as PET) displaying an intrinsic polarised fluorescence:
1. position of the object and extension in the scanning direction,
2. development of the $1^{st}$ momentum of the orientation distribution function,
3. development of the $2^{nd}$ momentum of the orientation distribution function.

In the case of PET, the intrinsic polarised fluorescence occurs selectively in the non-crystalline zones. These are decisive for the mechanical properties and for the receptivity for dyes of the object. Via a measurement of the momentums of the orientation distribution function, it is possible to use the aforedescribed system for a selective detection of the development and gradient of these parameters in the material.

Further characteristic parameters of the object to be measured can be detected if two beam paths (the beam path coming from the object and a (possibly modulated) reference beam path or a second beam path passing through the object space or coming from the object) are superimposed in the receiver unit in such a way that the beams will interfere with each other. Depending on the configuration of this beam path and the signal analysis it is then possible, in addition to the detection of the aforedescribed characteristic parameters, to detect the spacing or the contour of an object to be measured along the direction of the optical axis, or to detect the velocity of the movement of the object to be measured through the scanning plane. When the retro reflector principle is applied it is possible to establish the reference beam path in the form of a Michelson interferometer, for instance, inside the combined emitter/receiver unit. In the event of application of a separate receiver unit, the reference beam path (passing by the object to be measured) can be guided through the object space or by means of optical guides from the scanner to the receiver.

Figure 9:
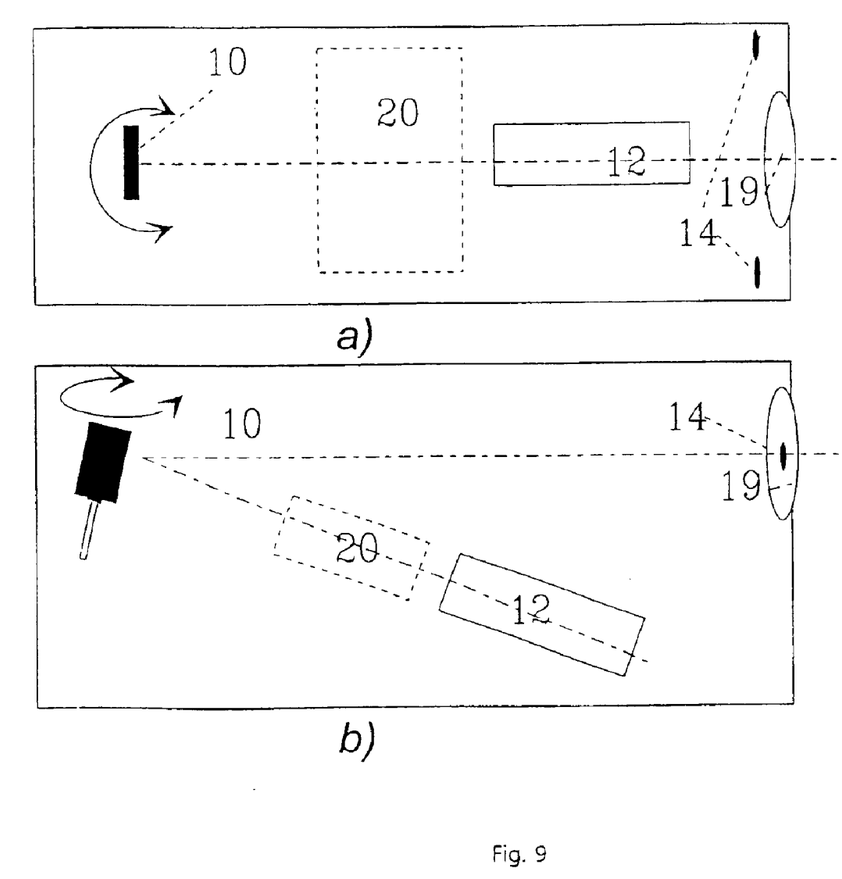

The aforementioned types of measurement may be combined with each other optionally. This can be realized in a particularly expedient manner when a modular system is provided which includes a scanner head, a measuring module and possibly a receiver housing with the optical system. As shown in FIG. 9, the scanner unit 1 includes a laser (12), a deflector unit (10), and an optical system 19, as wells as the following additional components, if necessary (when the reflection or retro scattering is measured or when a retro reflector unit is employed): receiver module (20) and scan start and scan stop reflector (14).

Figure 10:
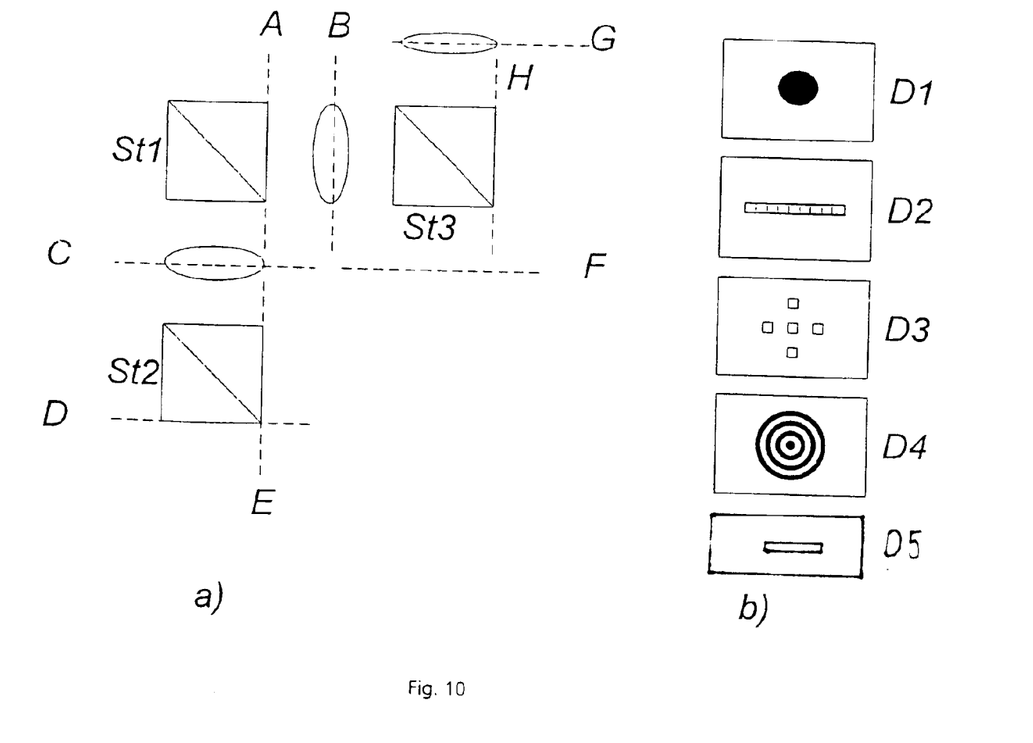
Figure 11:
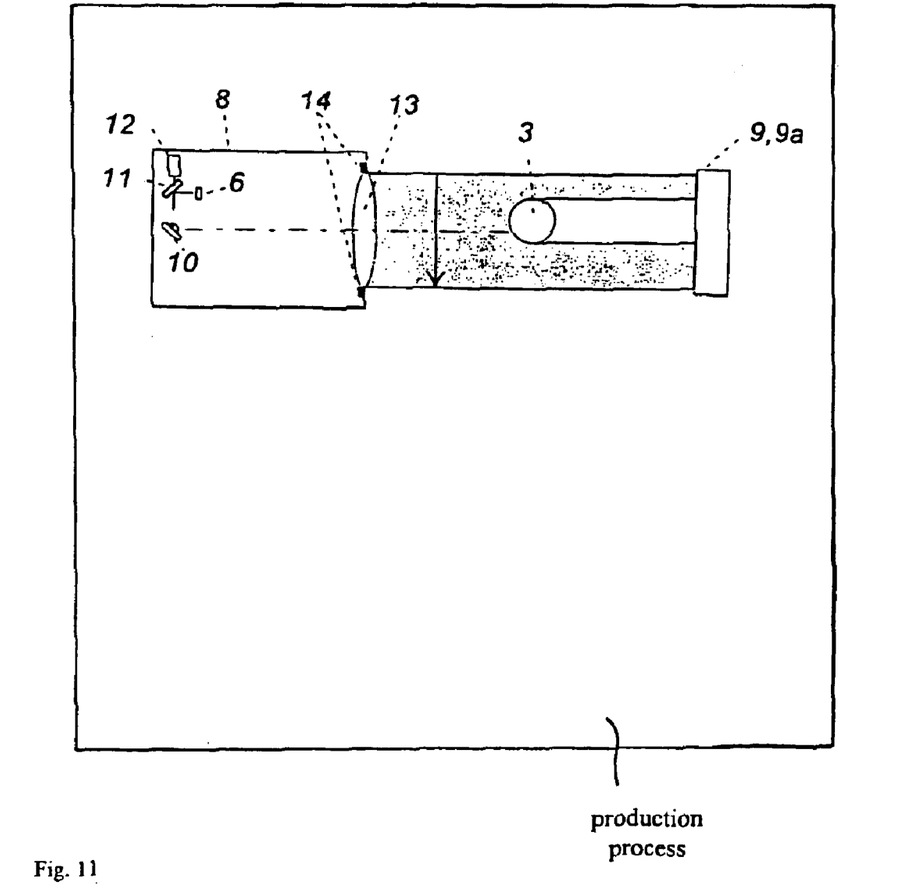
FIG. 11 schematically shows a laser scanning measurement system for controlling a production process.

The receiver module is provided with means for mounting detector modules thereon (cf. the schematic illustration in FIG. 10*b*), lenses or mirrors (items A to H in FIG. 10*a*) and beam splitters (cf. items St1 to St3 in FIG. 10*a*). Alternatively, a position-resolving photo diode D5 can be used in the present invention. Depending on the equipment of the receiver module and the selected arrangement various measured parameters can be derived. Some examples thereof are listed in Table 1:

TABLE 1

Examples of different configurations of an inventive laser scanner measuring system

| Mode | Receiver | Object | Parameters | Element | Item |
|---|---|---|---|---|---|
| 1 | separate 180° | glass tube | diameter, wall thickness, position of centre | photo diode array D2 | A |
| 2 | combined | glass tube | diameter, wall thickness, position of centre | beam splitter 50% photo diode array D2 | St1 C |
| 3 | separate 180° | transparent fibres | position diameter, degree of polarisation | beam splitter polarising annular photo diode D4 photo diode D1 | St1 B C |
| 4 | combined | transparent fibres | position diameter, degree of polarisation | beam splitter 50% beam splitter polarising annular photo diode D4 photo diode D1 | St1 St2 B C |
| 5 | combined | optically active layers | extension, thickness of layer | beam splitter 50% beam splitter polarising photo diode array D2 photo diode 1 | St1 St2 B C |
| 6 | combined | rods, tubes | diameter, conicality, deflection | grid parallel to scanning direction lens beam splitter 50% lens beam splitter 50% photo diode array D2 photo diode array D3 | H B St1 B St2 D E |
| 7 | combined | rods, tubes | diameter, position in the scanning plane, conicality, deflection, velocity | two-axis grid beam splitter lens beam splitter 50% lens beam splitter 50% photo diode array D2 photo diode array D3 photo diode D1 (active) mirror | H St3 C St1 C St2 D E F G |

The laser scanners according to the present invention are particularly suited for application for controlling manufacturing processes as they detect relevant process parameters which are then supplied as input signals to a process controller or automatic control system.

What is claimed is:

1. A laser scanner measuring system for measuring macroscopic geometric parameters of an object, the macroscopic geometric parameters including at least one of contour, size and wall thickness of the object, the system comprising:
    an emitter unit having a laser, a beam deflector unit and an optical emitter system which define a scanning beam path and a scanning plane of a scanning beam emitted from said emitter unit;
    a receiver unit including a photo detector disposed in the focal plane of an optical receiver system in a path of a receiver beam, wherein the surface normal of said optical receiver system is parallel with the scanning beam path, the receiver unit receiving said receiver beam after scanning the object and generating a signal;
    a dark field stop disposed ahead of said photo detector in the receiver beam path in the focal plane of said optical receiver system where the dark field stop is arranged to block a central beam in the receiver beam path;
    a beam splitter ahead of said dark field stop for splitting a partial beam from the receiver beam path, said photo detector including a photo diode arranged in said partial beam, said photo diode being disposed approximately in the focal point of said optical receiver system; and
    an electronic analyzing system for determining the macroscopic geometric parameters from the signal.

2. A laser scanner measuring system according to claim 1, wherein said emitter unit and said receiver unit are disposed on the same side relative to the object to be measured.

3. A laser scanner measuring system according to claim 2, further comprising a retro reflector unit arranged behind said object to be measured, when seen from said emitter unit, which retro reflector unit reflects any incident radiation back either in itself or with a parallel offset such that the receiver beam path will be located in a plane offset in parallel from the scanning plane.

4. A laser scanner measuring system according to claim 1, further comprising at least one retro reflector or a retro-reflecting marker disposed inside said emitter unit.

5. A laser scanner measuring system according to claim 1, further comprising additional receiver units or retro reflectors disposed at an angle different from 0° or 180° relative to an optical axis of the emitter unit in the scanning plane.

6. A laser scanner measuring system according to claim 1, further comprising an optical system arranged in the scanning beam path for splitting the scanning beam in a direction orthogonal on a scanning direction.

7. A laser scanner measuring system according to claim 6, wherein there is formed a grid having lines oriented orthogonally with respect to the scanning direction.

8. A laser scanner measuring system according to claim 1, further comprising an optical system arranged in the scanning beam path for splitting the scanning beam in a direction parallel with a scanning direction.

9. A laser scanner measuring system according to claim 8, where there is formed a grid having lines oriented parallel with respect to the scanning direction.

10. A laser scanner measuring system according to claim 1, further comprising optical elements disposed in the scanning beam path and/or the receiver beam path for radiation of different polarisation.

11. A laser scanner measuring system according to claim 1, further comprising filters selective in terms of wavelength disposed in the receiver beam path.

12. A laser scanner measuring system according to claim 11, wherein said filters are interference filters, color filters or cut-off filters.

13. A laser scanner measuring system according to claim 1, wherein said emitter unit and said receiver unit form a single combination unit and wherein a reference beam path is realised in the combination unit, outside the combination unit or by means of a light guide, which is superimposed by the receiver beam path coming from the object to be measured in such a way that a resulting interference pattern which varies locally and in the course of time is detected by means the photo detector.

14. A laser scanner measuring system according to claim 1, wherein said measuring system is adapted to control a production process.

15. A laser scanner measuring system according to claim 1, wherein said electronic analyzing system is adapted to determine diameters in two orthogonal directions of a transparent rod or tube placed as said object in the scanning beam path from intensity maxima on the photo detector.

16. A laser scanner measuring system according to claim 1, wherein said electronic analyzing system is adapted to determine a diameter and wall thickness of a transparent tube placed as said object in the scanning beam path from intensity maxima on the photo detector.

17. A laser scanner measuring system for measuring macroscopic geometric parameters of an object, the macroscopic geometric parameters including at least one of contour, size and wall thickness of the object, the system comprising
    a scanner unit formed by an emitter unit having a laser, a beam deflector unit and an optical emitter system, which define a scanning beam path as well as a scanning plane of a scanning beam emitted from said emitter unit;
    a receiver unit including a photo detector disposed in the focal plane of an optical receiver system in a path of a receiver beam, the surface normal of said optical receiver system being parallel with the scanning beam path, and said photo detector being a photo diode array containing at least two photo diodes or a position-resolving photo diode, the receiver unit receiving said receiver beam after scanning the object and generating a signal; and
    an electronic analyzing system for determining the macroscopic geometric parameters from the signal.

18. A laser scanner measuring system according to claim 17, wherein said emitter unit and said receiver unit are disposed on the same side relative to the object to be measured.

19. A laser scanner measuring system according to claim 18, further comprising a retro reflector unit provided behind said object to be measured, when seen from said emitter unit, which reflects any incident radiation back either in itself or with a parallel offset such that the receiver beam path will be located in a plane offset in parallel from the scanning plane.

20. A laser scanner measuring system according to claim 17, further comprising at least one retro reflector or a retro-reflecting marker disposed inside said emitter unit.

21. A laser scanner measuring system according to claim 17, further comprising additional receiver units or retro reflectors disposed at an angle different from 0° or 180° relative to an optical axis of the scanner unit in the scanning plane.

22. A laser scanner measuring system according to claim 17, further comprising an optical system arranged in the scanning beam path for splitting the scanning beam in a direction orthogonal on a scanning direction.

23. A laser scanner measuring system according to claim 22, wherein there is formed a grid having lines oriented orthogonally with respect to the scanning direction.

24. A laser scanner measuring system according to claim 17, further comprising an optical system arranged in the scanning beam path for splitting the scanning beam in a direction parallel with the scanning direction.

25. A laser scanning measuring system according to claim 24, where there is formed a grid having lines oriented parallel with respect to the scanning direction.

26. A laser scanner measuring system according to claim 17, wherein said electronic analyzing system is adapted to determine diameters in two orthogonal directions of a transparent rod or tube placed as said object in the scanning beam path from positions of local intensity maxima on one photo diode of the photo diode array or the position resolving photo diode.

27. A laser scanner measuring system according to claim 17, wherein said electronic analyzing system is adapted to determine a diameter and wall thickness of a transparent tube placed as said object in the scanning beam path from positions of local intensity maxima on one photo diode of the photo diode array or the position resolving photo diode.

* * * * *